United States Patent [19]

Toman

[11] 4,129,870
[45] * Dec. 12, 1978

[54] APPARATUS FOR SYNTHESIS OF SCANNING BEAM

[75] Inventor: Donald J. Toman, Pleasantville, N.Y.

[73] Assignee: Tull Aviation Corporation, Kansas City, Mo.

[*] Notice: The portion of the term of this patent subsequent to Sep. 20, 1994, has been disclaimed.

[21] Appl. No.: 838,094

[22] Filed: Sep. 30, 1977

[51] Int. Cl.² ............................. G01S 1/16; G01S 1/54
[52] U.S. Cl. ............................. 343/106 R; 343/108 M
[58] Field of Search ......... 343/106 R, 108 M, 100 SA

[56] References Cited

U.S. PATENT DOCUMENTS

3,735,407  5/1973  Meyer ............................. 343/106 R
3,925,781  12/1975  Hulett et al. ..................... 343/106 R Primary Examiner—Theodore M. Blum
Attorney, Agent, or Firm—Curtis Ailes

[57] ABSTRACT

Radio frequency energy is rapidly switched from a transmitter in a repeating sequence of bursts of radio frequency energy to the different ones of a plurality of radiation beam ports, and the individual bursts of radio frequency energy are modulated in a predetermined program to provide a composite beam energy profile which is a synthesized directional beam which moves at a predetermined desired scanning rate. The energy levels of the successive individual bursts of raido frequency energy from each radiation beam port produces a composite energy profile from that port which is representative of the impulse response function of a low pass filter.

8 Claims, 5 Drawing Figures

APPARATUS FOR SYNTHESIS OF SCANNING BEAM

CROSS-REFERENCE TO RELATED APPLICATION

U.S. Pat. No. 4,050,074 for BLENDED STEP SCAN BEAM SIGNAL FROM FIXED BEAM COMPONENTS issued Sept. 20, 1977 on an application filed by Donald J. Toman and assigned to the same assignee as the present application.

This invention relates to the production of directional scanning beams of radio energy radiation, usually carried out at microwave frequencies. The invention is particularly useful in the field of aircraft navigation and guidance systems, such as instrument landing systems for guiding aircraft to safe landings.

Scanning directional beams of radio frequency energy are known to be very useful in the field of radio guidance for aircraft. Various scanning beam navigation and guidance systems have been built and have been proposed as standards. One particularly useful mode of utilization of scanning beams, which is a preferred mode for use in conjunction with the present invention, is by reciprocal scanning, including "to" and "fro" scans, and by a measurement of the interval between resultant signals at the receiver as an indication of angular position. This system of scanning is disclosed for instance in connection with FIG. 7 of U.S. Pat. No. 3,757,337 issued Sept. 4, 1973 on an invention by George Lichford entitled "AIRCRAFT INSTRUMENT LANDING SYSTEM". This signal format (including the "to" and "fro" scan) has been proposed for use in a new microwave landing system which is presently under development by the United States Federal Aviation Administration of the Department of Transportation. The proposed new system is described in various publications, including a report dated December 1975 entitled "Time Reference Scanning Beam Microwave Landing System" issued by the U.S. Department of Transportation, Federal Aviation Administration and submitted to the International Civil Aviation Organization. This report is hereinafter referred to simply as "the FAA report".

One of the simplest methods for transmitting a scanning beam is to use an antenna which is mechanically moved in an arcuate pattern to provide the scanning signal. However, mechanically movable antenna structures present many problems which are to be avoided if possible. For instance, considerable wear is involved for apparatus which is to be operated on a substantially continuous basis. This results in high maintenance costs, as well as reliability problems. Also, a considerable mechanical energy input is required. Furthermore, rates of scan are often desired which are considerably higher than can be achieved economically with mechanically movable scanning antennas.

Accordingly, it is very desirable to provide the scanning motion of the scanning beam by electrical variation of the radiated signals from fixed antenna elements, rather than by mechanical motion of the antenna elements. Various proposals have been made for achieving this electrical scanning. For instance, one technique which has been proposed to produce a quasi-continuous scanning beam from a beam port antenna is by simultaneously feeding more than one beam port, and, as a function of time, changing the relative energy fed to adjacent ports. This results in a beam which is formed in space with energy contours which scan through space in what amounts to a continuous manner. However this method requires antennas which are of the type which have a common phase center, permitting true vector addition of the energy fields from the different ports.

However, antenna arrays in which the different beam ports have a common phase center are inherently substantially more expensive than antenna arrays which do not have this requirement and limitation. Common phase center antennas also tend to be inefficient. Such antennas rely basically upon microwave optics, and they are thus subject to problems of dimensional stability, particularly in the presence of wide variations in temperature, and over extended periods of time. Thus, the stability problems increase the first cost of the structures and require substantial maintenance in the form of periodic adjustments.

Accordingly, it is an important object of the present invention to provide for the synthesis of continuously scanned radio energy beams from fixed beam components without the requirement for antenna arrays having a common phase center.

Another prior proposal for production of a simulated scanning beam from a stepped beam antenna structure is disclosed in U.S. Pat. No. 3,735,407 issued May 22, 1973 to Maurice A Meyer and entitled "Stepped Beam Instrument Landing System". However, the system described in that proposal apparently requires the transmission of elaborate timing signals in conjunction with the transmission of energy from each antenna port, and a rather complicated receiver which is operable to receive and decode the timing signals as well as the arrival times of the stepped beam signals in order to measure an angular bearing with respect to the transmitter.

It is another object of the present invention to overcome the above-mentioned complications of the prior stepped beam instrument landing system, and to provide for the synthesis of continuously scanned beams of radio energy which can be received and processed by a receiver which does not differ substantially from a receiver which may be used for a scanning beam which is transmitted by other means, such as an array having a common phase center, or by a physically movable antenna.

It is another object of the invention to provide the signals from the transmitter in a form which permits a simplification of the aircraft receiver which is to receive the signals by eliminating the need for a low pass filter in the aircraft receiver.

Further objects and advantages of the invention will be apparent from the following description and the accompanying drawings.

The invention may be carried out by an apparatus for synthesizing a continuous scanning beam of radio energy comprising an array of fixed antenna elements providing radiation beam ports aimed radially outwardly to different angles in an arc over which the scanning beam is to be scanned, a source of microwave radio frequency energy, switching means connected between said energy source and said antenna elements and operable for rapidly switching the radio frequency energy in a repeating sequence of bursts of energy to illuminate the different ones of the radiation beam ports at a switching frequency which is substantially greater than the rate of successive interception of the scanning beam to by synthesized with the individual radiation beam port positions, means connected for modulating the energy levels of the individual bursts of radio frequency energy in a predetermined program to provide a composite beam energy profile which is a synthesized directional beam which is moving at a predetermined desired scanning rate, said modulating means being operable to provide energy levels of the successive individual bursts of radio frequency energy from each radiation beam port producing a composite energy profile from that port which is representative of the impulse function of a low pass filter.

Figure 1:
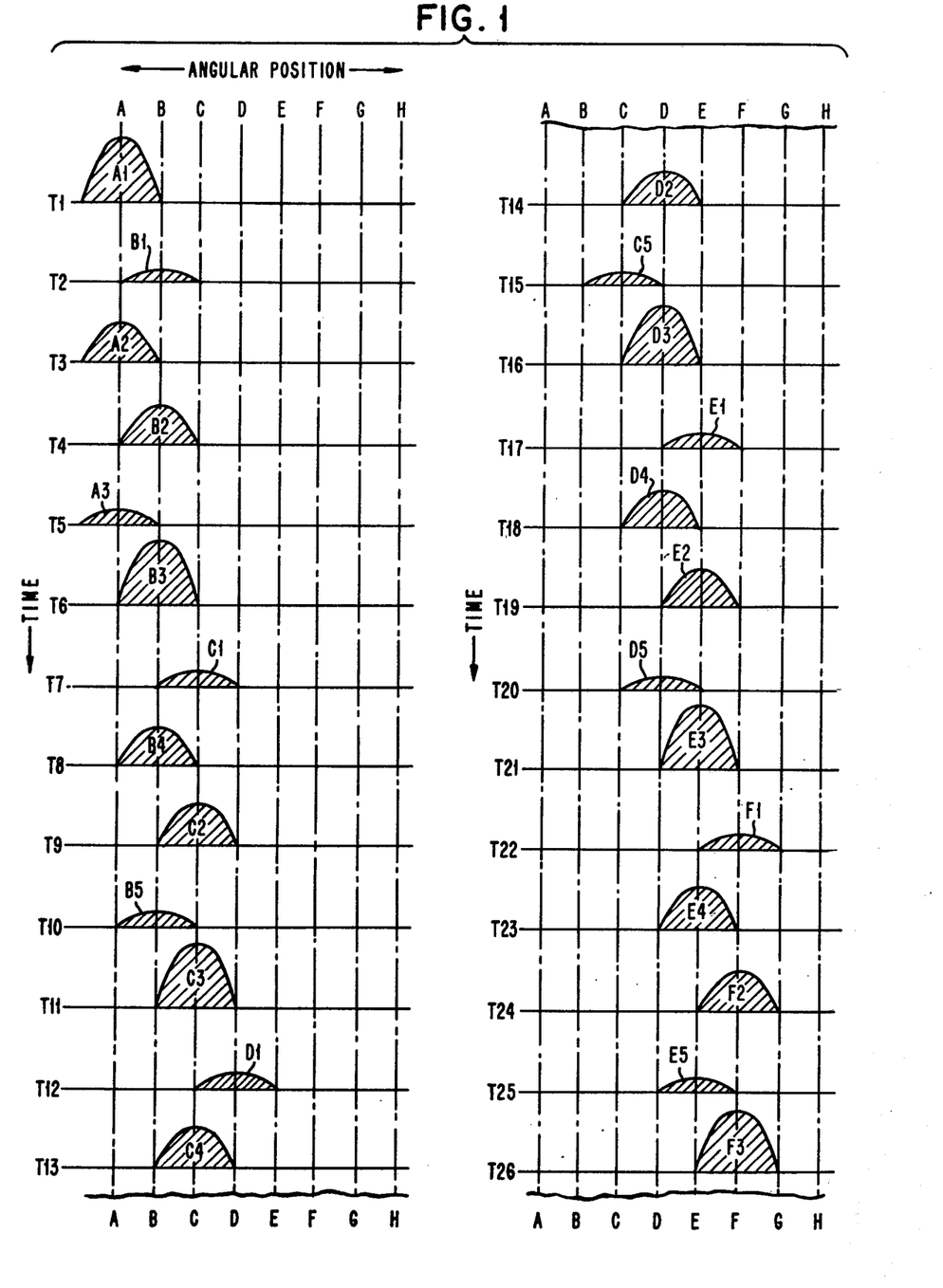
FIG. 1 is a diagrammatic representation of the sequence of signals which may be emitted from adjacent radio energy beam ports at successive time intervals to produce the resultant synthesized scanning beam.

Referring more particularly to FIG. 1, there is illustrated the principle of operation of the present invention, in a very simplified and elemental version thereof. The vertical center lines labelled with the letters A–H in FIG. 1 represent different fixed beam port positions in accordance with polar coordinates. Thus, the different horizontal positions represent different angles of displacement from a common center position. Thus, each of the lettered center lines represents the angular position of the beam available from a single transmitter antenna port.

Arranged vertically downwardly from the upper left hand corner of FIG. 1, are representations of the beams actually radiated from the various beam ports at successive intervals of time which are respectively labelled T1, T2, T3, et seq. The beam energy radiated at each port is represented by a shaded beam outline associated with a particular time interval. Thus, at time T1, a high energy beam A1 is radiated from port A. At time T2, a low energy beam B1 is radiated from port B. At time T3, a medium energy beam A2 is radiated from port A, and at time T4, a medium energy beam B2 is radiated from port B. Next, a final low energy beam A3 is radiated from port A at T5, and then a high energy beam B3 is radiated from port B at time T6. At time T7, a low energy beam C1 is radiated from beam port C. The pattern then continues as illustrated for times T8–T13, and through times T14 et seq. as shown beginning at the upper right hand portion of FIG. 1. The individual beam port radiations are illustrated through time interval T26. For symmetrical completion of the series through port H, 36 time intervals are required. However, the last ten time intervals are not illustrated, since they simply continue the pattern which is fully illustrated for times T1 through T26.

In the sequences of illuminations of each individual port, the successive illuminations generally increase and then decrease in energy. Thus, referring to time intervals T2, T4, T6, T8, and T10, the successive illuminations of port B designated B1, B2, B3, B4, and B5 gradually increase from a low energy at B1 to a high energy at B3, and then again decrease to a low energy at B5. Each illumination of port B is interlaced with an illumination of an adjacent port. Thus, the order starting from time T2 is B1, A2, B2, A3, B3, C1, etc. As the energy levels of the successive illuminations of port B are increasing, the interlaced illuminations A2 and A3 of port A are decreasing in energy. Then, as the successive illuminations B3, B4, and B5 of port B are decreasing in energy, the successive interlaced illuminations C1, C2, and C3 of port C are increasing. It will be appreciated that by these patterns of interlaced illuminations of adjacent ports, and by the coordinated changes in radiation energy levels, there is an apparent substantially smooth movement of the resultant energy profile through the individual port angles, thus synthesizing a moving beam energy profile.

Because of the substantial overlap in the angular regions covered by the radiations from each port with adjacent port positions, the energy from the adjacent beam ports is additive in the overlap region. The sequence frequency, that is the switching frequency at which the individual bursts of carrier are initiated at the T1, T2, T3, etc. time intervals is relatively high in relation to the scanning movement of the resultant synthesized beam. Thus, the sequence of bursts of the radio frequency energy is switched to the different radiation beam ports at a switching frequency which is substantially greater than the rate of successive interception of the scanning beam to be synthesized with the individual radiation beam port positions. For instance, it might be said that the synthesized scanning beam intercepts port A at time T1, intercepts port B at time T6, and intercepts port C at time T11. This statement is at least approximately true since the maximum energy illuminations of those three ports occur on those respective time cycles. Thus, while the synthesized beam moves from an interception with port A to interception with port B, there are five switching steps T2 through T6.

As explained more fully below, the receiver used to receive the scanning beam information is preferably equipped with a low pass filter for the demodulated signals which has a cut-off point below the frequency of the switching frequency for the sequence of bursts of radio frequency energy. Thus, this filtering serves to cause the sequence of bursts of radio frequency energy, as demodulated, to blend together, and to provide what appears to be a beam which is scanning with a substantially smooth and uniform rate of movement. Because of the interlacing (alternations of illuminations from different ports) of the scan sequence steps T1, T2, etc., and because of the blending of the energy levels resultant from the beam illumination sequence, the present invention is sometimes referred to hereinafter as a "blended step scan". Thus, the blending of the energies of the successive beam port illuminations creates a resultant synthesized scanning beam.

The arrangement of eight beam ports A-H illustrated in FIG. 1 may be employed for azimuth guidance. With spacings between adjacent beam port center lines of 3.6°, this provides a total scan range from the center line of the first port of the center line of the last port of 25.2°.

For purposes of analysis, it is useful, though not essential, to characterize the sequence of switching of radio frequency energy from port to port as being divided into sub-sequences, and each sub-sequence may be associated with an increment of movement of the scanning beam. Thus, beam illuminations A1 and B1 at times T1 and T2 may be characterized as a first sub-sequence, A2–B2 as a second sub-sequence, A3–B3 as a third sub-sequence etc. Therefore, it may be said that each sub-sequence in the sequence illustrated in FIG. 1 consists of illuminations of each of two adjacent ports. A sub-sequence is generally defined as a succession of illuminations from different beam ports which provide a collective energy profile for a particular position of the synthesized scanning beam. While FIG. 1 is a simplified representation of the invention, employing only two beam port illuminations per sub-sequence, it is preferred that every sub-sequence should include the illumination of at least three beam ports, and perhaps four or more beam ports. By combining illuminations at modulated levels from three or four beam ports on each sub-sequence, a much improved synthesized scanning beam shape can be maintained.

The illumination of more than two beam ports in a particular sub-sequence makes more sense when it is appreciated that only the highest energy peak portions of the beams from the beam ports are illustrated in FIG. 1 in order to promote clarity. However, each beam available from each beam port is wider than illustrated in these drawings in the lower energy portions thereof. Thus, there is much more overlap in the lower energy portions of the beams than is illustrated in these drawings. Therefore, illumination of three or four or more beam port positions on each sub-sequence, at controlled modulation levels, can provide a composite synthesized scanning beam which comes very close to approximating a desired ideal beam shape.

Figure 2:
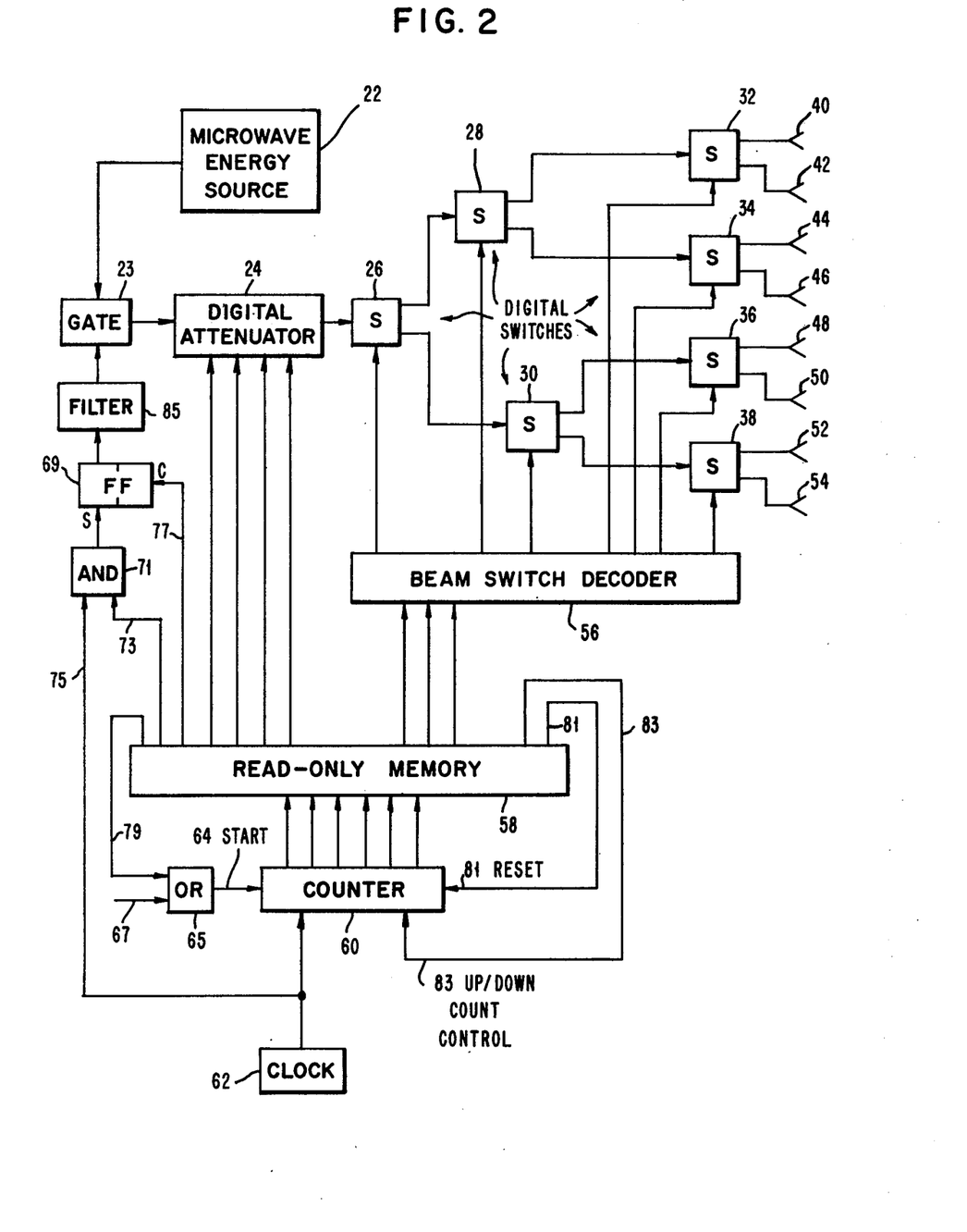
FIG. 2 is a schematic diagram of a transmitter for carrying out the invention.

FIG. 2 is a schematic representation of the organization of a transmitter for carrying out the present invention by transmitting signals such as described above in connection with FIG. 1. The transmitter includes a source 22 of microwave energy connected to supply such energy through a gating attenuator 23 and a digital attenuator 24, and then through a set of digital switches 26–38 to individual antenna elements 40–54. The digital switches 26–38 are connected for control by a beam switch decoder 56 so that the microwave energy is switched through to only one antenna element 40–54 at a time. Both the beam switch decoder 56, and the digital attenuator 24 are preferably controlled by different portions of individual digital words which are read from a read-only memory 58. The words selected to be read from the read-only memory 58 are selected in accordance with memory addresses supplied by a digital counter 60 which operates under the control of a system clock 62. The counter 60 may be started by a signal on a connection indicated at 64 which may be supplied through an OR gate 65 from a connection 67 from the master control of a larger system of which the present transmitter system forms a part, or to a manual "start" switch.

The microwave energy source 22 is preferably operable in the C-band within a range of frequencies allocated for navigation signals. The digital attenuator 24 is operable in accordance with a portion of the digital word read from the read-only memory 58 to provide various selected values of attenuation of the microwave energy, as required by the predetermined program of sequential illuminations of the various beams ports. The microwave energy is steered from the digital attenuator 24 through each tier of digital switches to the one antenna element selected by the portion of the memory word read from the read-only memory 58 to the beam switch decoder 56. Thus, when the control connections from the beam switch decoder 56 to the respective digital switches 26, 28, and 32 are such as to switch the microwave energy to the upper output of each of these digital switches, the result is that the microwave energy is ultimately delivered to antenna element 40. In a similar manner, switch 26, and one of the switches 28 and 30, and one of the third tier switches 32–38 are always operated to select one of the eight antenna elements 40–54 for the radiation of a burst of the microwave energy. In coordination with this beam switching, for each burst of energy, a particular attenuation value is selected for the attenuator 24 by the portion of the data word read from the read-only memory and supplied to that digital attenuator. Thus, by this means, the correct attenuation is selected in conjunction with the selection of the correct beam port.

In order to precisely gate the energy through the digital attenuator 24 at a time immediately after all of the control voltages have been applied by the read-only memory 58 and the beam switch decoder 56 to the digital attenuator 24 and the switches 26–38, the timing gate attenuator 23 is provided. Gate attenuator 23 is controlled through a filter 85 by a flip-flop 69, which is switched to the "set" condition by an AND gate 71 upon the coincidence of an appropriate read-only memory signal at connection 73 with a clock signal on connection 75 from system clock 62. The end of the burst of energy is determined by closing the gate attenuator 23 by clearing the flip-flop 69 from a signal supplied on connection 77 from the read-only memory 58. The gate attenuator is preferably a linear attenuator, and the filter 85 imparts a desirable rise and fall characteristic to the control signal so that each gated pulse or burst of energy has a desirable characteristic, which may approach a cosine squared characteristic, for instance.

The system may also be controlled automatically by restarting the counter 60, by a start signal emitted from the read-only memory 58 at connection 79. Control signals may also be provided at connections 81 and 83 from the read-only memory 58 for respectively resetting the counter 60 and controlling whether the counter counts up or down. Thus, the to and fro scans of the scanning beam may be synthesized by first having the counter 60 count up for the "to" scan, and then having the counter count down for the "fro" scan. Furthermore, in the to and fro scan mode, there is typically a substantial time gap between the end of the to scan and the beginning of the fro scan. This time interval can also be provided by the operation of read-only memory 58 by programming the required number of timing intervals when the gate 23 simply is not opened to permit the transmission of any energy bursts.

In the above description, the energy of each burst of carrier frequency is modulated by the digital attenuator 24. This attenuator accomplishes an energy modulation by modulating the amplitude of the transmitted carrier. This is the preferred means for accomplishing the energy modulation of each burst of carrier. However, it will be understood that it is also possible to modulate each burst of carrier frequency energy by controlling the duration of each burst of energy. Thus, a higher energy is transmitted if the energy is transmitted for a longer burst interval, and less energy is transmitted if the burst interval is reduced. This mode of modulation is referred to as pulse duration modulation. Either form of energy modulation may be employed.

Figure 3:
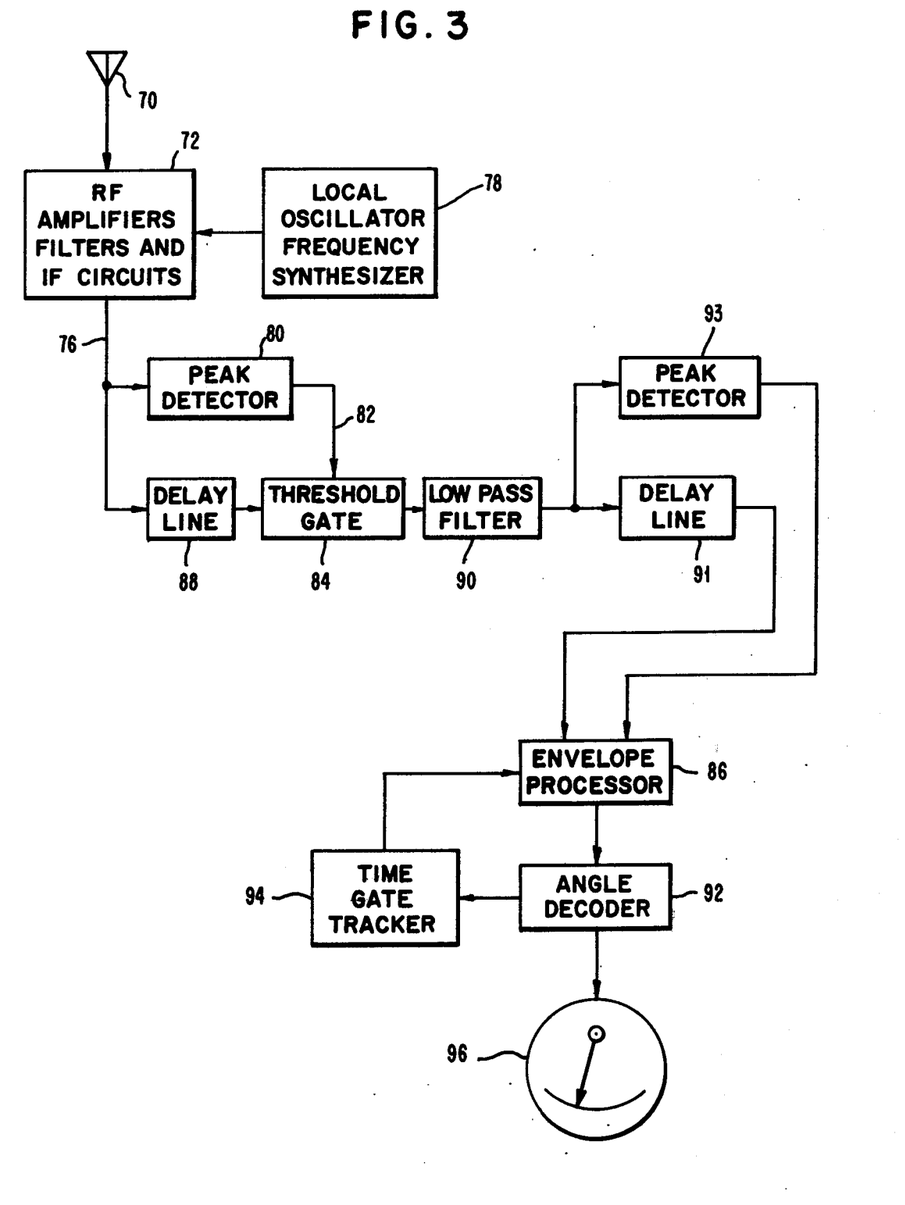
FIG. 3 is a schematic diagram illustrating a receiver used for carrying out the invention.

FIG. 3 is a schematic diagram of a receiver for carrying out the present invention, with particular emphasis on the parts of the receiver that are pertinent to the present invention.

The receiver includes an antenna schematically shown at 70 which receives the scanning beam signals. Antenna 70 supplies those signals to the early stages of the receiver indicated at 72, which include radio frequency amplifiers, filters, and intermediate frequency circuits. These circuits amplify the received signals, filter out unwanted adjacent signals, and convert the microwave signal to a "video" signal at connection 76. A local oscillator frequency synthesizer is provided, as indicated at 78, which supplies suitable local oscillator frequencies to the mixers within 72 for accomplishing the frequency conversions.

While the present invention relates generally to the production of synthesized scanning beams, the receiver of FIG. 3 is particularly adapted for receiving and processing scanning beams in the "to" and "fro" mode. The amplitude of the peak of the received energy, as indicated by the video signal on connection 76, is detected by a peak detector circuit indicated at 80, and the resultant output at connection 82 from peak detector 80 is used to set threshold gate circuit 84.

The video signal is then supplied from connection 76 through a delay line 88, the threshold gate 84, a low pass filter 90, and a second delay line 91 to the envelope processor 86. The envelope processor 86 is operable in cooperation with an angle decoder circuit 92, and a time gate tracker circuit 94 to determine the angular bearing of the receiver with respect to the transmitter, and to indicate the bearing angle on an indicator 96.

Because of the delay line 88, the threshold gate 84 is fully set and ready to process each received pulse of energy on the basis of the peak detector measurement of the highest peak of a preceding group of energy pulses.

The threshold gate 84 is preferably designed to reject all energy pulses which are at an energy level more than 10 decibels below the peak level as determined by the measurement of peak detector 80. This provides the advantage of discarding low amplitude portions of the synthesized scanning beam. This means that the synthesis of the scanning beam can have substantial imperfections below the minus 10 decibels level without affecting the accuracy of the system. The rejection of the signal components below the minus 10 decibel level also provides the advantage of discriminating against spurious signals which may arise because of reflections, etc., and which are sometimes referred to as "multipath" signals.

The "clean" signal pulse, which has been cleansed of all components more than 10 decibels down from the peak, is then smoothed by passage through the low pass filter 90 and supplied to the envelope processor 86. Filter 90 is preferably a linear phase filter, such as a Bessel function filter. The envelope processor 86 precisely determines when the "to" and "fro" beams scan by the aircraft. The resultant signals are supplied to the angle decoder 92 which determines the azimuth or elevation angle based upon the time interval between the "to" and "fro" scans. Such angle determination signals then appear on the output of the angle decoder 92, and are indicated on the angle indicator 96. The time gate tracker circuit 94, which is connected between the angle decoder 92 and the envelope processor 86, designates which of the to and fro scans are to be processed. The detection of the timing of passage of the to and fro scan pulses is preferably carried out by detecting, in the envelope processor 86, the leading and trailing edges of each energy pulse, as determined at an energy level 4 decibels down from the peak. That energy level is determined within the envelope processor 86 on the basis of a measurement of the energy peak of the filtered scan pulse by a second peak detector 93.

The peak detectors 80 and 93 each have a relatively long memory in terms of measuring and retaining a measurement of the peak energy received in an entire "to" or "fro" scan interval. This memory feature may be carried out in a number of conventional ways. For instance, each peak detector may include a capacitor which is charged to the peak voltage level, and a high resistance charge leakage resistor which provides for dissipation of the charge over an interval which is fairly long in relation to the scan interval. That is the preferred arrangement. However, it is also a workable alternative to simply omit the leakage resistor, and to provide a timed discharge switch to discharge the capacitor at intervals corresponding to the end of a to or fro scan.

Since the peak detector 80 and the threshold 84 "look" at the unfiltered demodulated received pulses, it will be appreciated that entire pulses are discarded by gate 84 if they are below the minus 10 decibel level. Thus, only the strongest component pulses are passed on to the low-pass filter to be integrated into the composite energy profile which is seen by the envelope processor. Then, because of the operation of peak detector 93, and th envelope processor, in looking only at the minus four decibel levels of the composite energy pulse, it is only the substantial peak of the energy that is actually relied upon in the receiver.

Any delays and asymmetries introduced by the low-pass filter 90 are cancelled out by the "to" and "fro" scan because both scans are delayed, or otherwise affected by the filter, in the same way for both scans, without changing the interval between scans.

The receiver, as just described, is quite capable, without any modification whatever, of receiving and processing to and fro mode scanning beam signals which are produced by means other than the scanning beam snythesis of the present invention. Thus, the receiver can process beams that are scanned by mechanically movable antenna structures, or by simultaneously fed beam ports having a common phase center. The receiver is substantially the same as prior receivers proposed for prior scanning beam systems, with the exception of the provision of the additional threshold gate 84.

The threshold gate 84 is not believed to be absolutely essential in the practice of the present invention; however it is believed to be very desirable because of the rejection of low amplitude noise signals, and low amplitude signals which may represent imperfections in the synthesis of the scanning beam.

It will be appreciated that the principles of the present invention may be applied to systems operating in different modes, at different frequencies, and for purposes other than those specifically disclosed. However, without intending to limit the scope of the invention, in order to more fully exemplify a preferred embodiment of the invention, particular frequencies, scan rates, and other circuit and operating constants are given below for the preferred embodiment.

As previously mentioned above, the arrangement of eight beam ports illustrated in FIGS. 1 and 2 may be employed for azimuth guidance, with spacings between adjacent beam port center lines of 3.6°. This provides a total scan range from the center line of the first port to the center line of the last port of 25.2°. In the preferred embodiment, the microwave carrier frequency is in C successive illuminations of the ports taken place at evenly spaced angular positions with respect to the array.

Figure 4:
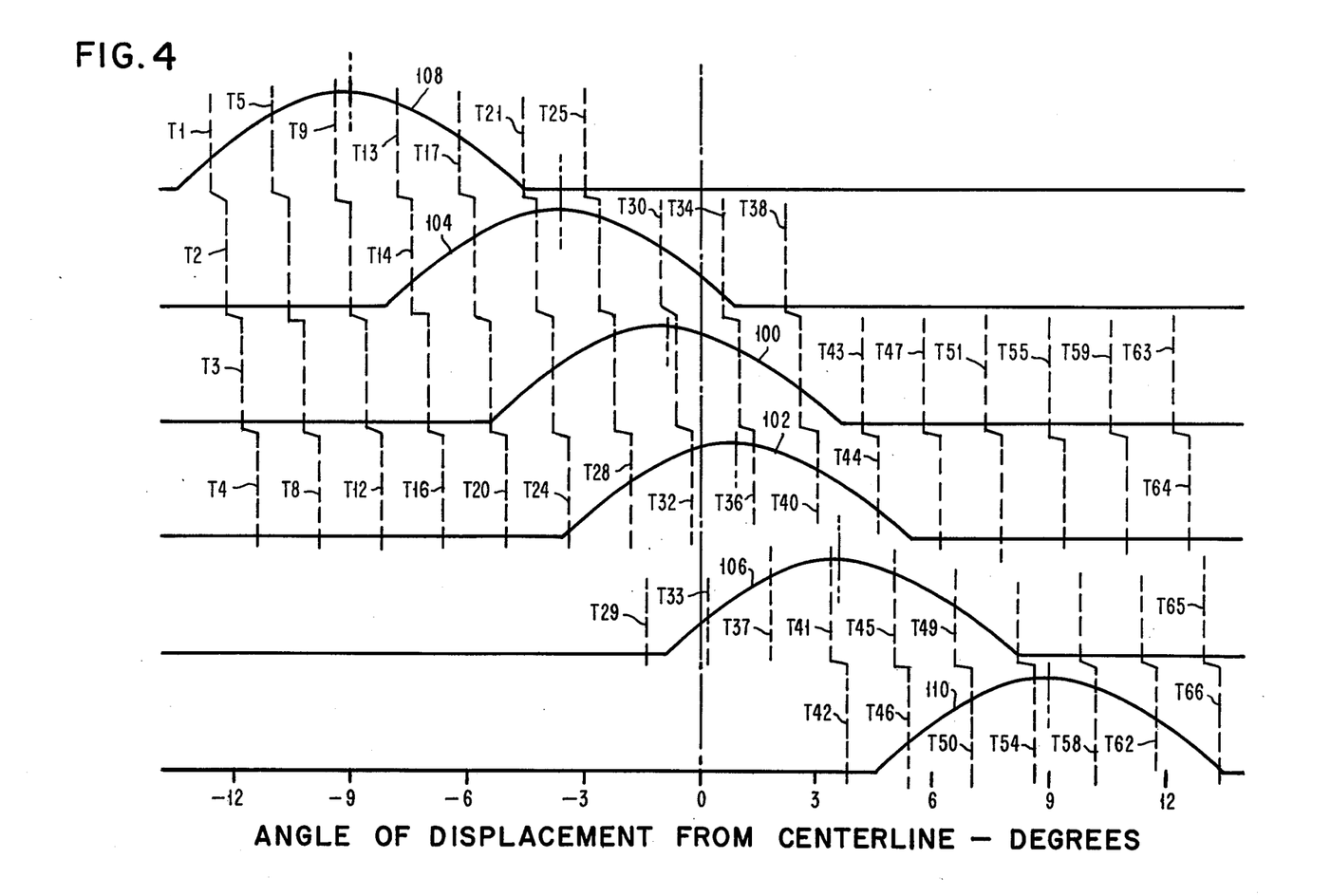
FIG. 4 illustrates the mode of transmission of successive illuminations from a dilating beam antenna array for the synthesis of a moving beam in which the same filter function is transmitted from each port.

The filter function curves 100 and 102 represent the functions to be produced by the beam ports which are spaced at 0.9° on each side of the central plane. The curves 104 and 106 represent the filter functions to be produced by the ports that are spaced a 3.6° on opposite sides of the central plane, and the curves 108 and 110 represent the filter functions to be produced by the beams at 9° on opposite sides of the central plane.

Consistent with the notation employed in FIG. 1, the individual port illuminations are numbered T1, T2, etc. in FIG. 4, and assuming a scan from left to right, the scanning is commenced with a sub-sequence of four successive illuminations T1, T2, T3, and T4, as indicated by dotted lines at the left side of FIG. 4. These four dotted lines are tied together so as to indicate their association in a sub-sequence. However, the sub-sequence concept is not absolutely essential to the operation of the invention, and is basically simply an aid in understanding the method of the invention. The next sub-sequence is then immediately commenced with illumination T5 and continuing to illumination T8. The horizontal spacing between the beginning of the first sub-sequence with illumination T1, and the beginning of the second sub-sequence beginning with illumination T5 corresponds to 1.6°. This represents the angular interval between the beginning of successive sub-sequences when the frequency of recurrence of sub-sequences is 12.5 kHz, and when the scanning speed of the synthesized scanning beam is 50 microseconds per degree (or 20,000° per second). Thus, each degree is equal to one twenty-thousandth of a second in FIG. 4, and each 1.6° is representative of one twelve thousand five hundredth of a second.

The point of crossing of each of the dotted vertical illumination lines T1, T2, etc. with the associated filter function curve is indicative of the amplitude of the signal from the corresponding port for that particular illumination. Thus, as illustrated in FIG. 4, the amplitude of the illumination represented by T1 from the 9° port represented by function curve 108 is about one third of the maximum amplitude, and the T2, T3, and T4 illuminations are at zero amplitudes. As seen in FIG. 4, this sort of situation, in which only one illumination of the sub-sequence has a non-zero value, continues until the fourth sub-sequence when illuminations T13 and T14 both have a non-zero value and a "blend" occurs between the functions 108 and 104. As further illustrated in FIG. 4, the samples represented by the successive illuminations T1, T5, T9, T13, T17, and T21 at curve 108 gradually increase and then decrease to provide a representation of the filter function curve. It should be emphasized that all of these increasing and decreasing amplitude samples are actually emitted at the fixed angular displacement of minus 9° of this particular antenna port. Thus, the angular displacements of the successive illumination vertical lines at T1, T5, T9, T13, T17, and T21 are only representative of successive time-angle relationships of the scanning beam which is being synthesized. A good way to visualize what is happening is to consider an aircraft receiver which might be positioned at the minus 9° angle. As the various illuminations occur, the receiver would see gradually increasing and then decreasing amplitude samples (illuminations) which would truly represent an amplitude versus time characteristic which would be transmitted by an actual physically scanning beam.

The sub-sequences continue into the sub-sequence T21–T24 in which each of the four samples from each of four adjacent ports have a positive value. From that sequence on, the sequences are out of the range of the minus 9° port curve 108, so that the illumination represented by T25 has a zero value. The scan continues into the angular position near 0° where there should be a contribution from the characteristic curve 106 for the 3.6° port. Accordingly, illuminations T29, T33, etc. are taken from that port instead of from the minus 9° port represented at curve 108. Thus, the first illumination member of the four illumination sequence beginning with T29 continues with illuminations T30, T31, and T32, and the next following sequence consists of the illumination T33 from function curve 106 (the plus 3.6° port) followed by illuminations T34, T35, and T36. Soon thereafter, as the function curve 104 is passed, and the function 110 is approached, no further scans are required for the curve 104, and scans are required for the curve 110. Accordingly, starting with illumination T42, the four illuminations in the sub-sequence are T41 at function 106, T42 at function 110, T43 at function 100, and T44 at function 102. The same order of scanning in the subsequences then continues through to the end. Finally all of the illuminations in each sub-sequence have a zero value except the illumination for function curve 110 for the plus 9° beam port.

As indicated in FIG. 4, the uniform filter function for each beam port must have an angular width which is approximately equal to the characteristic beam energy width of the widest beam port, that width being about 9° in the illustrative example.

Since the beam port energy profile will generally provide a higher maximum energy at the center line of the beam port as the energy profile is narrowed, in order to provide for uniform results in this blended scanning beam arrangement, the maximum energy level at the center line of the beam port must be substantially equal for each of the ports. The equalization of energy from the various beam ports is accomplished preferably by a proportional adjustment of the duration of the burst of carrier energy from each beam port. Thus, for the narrower ports having higher maximum center line energy levels, the duration of each burst of radio frequency energy is proportionally reduced to provide a net energy level substantially equal to the energy level at the wide beam ports. That adjustment in duration of the burst of energy is uniformly applicable to all bursts of energy from a particular beam port antenna element.

Figure 5:
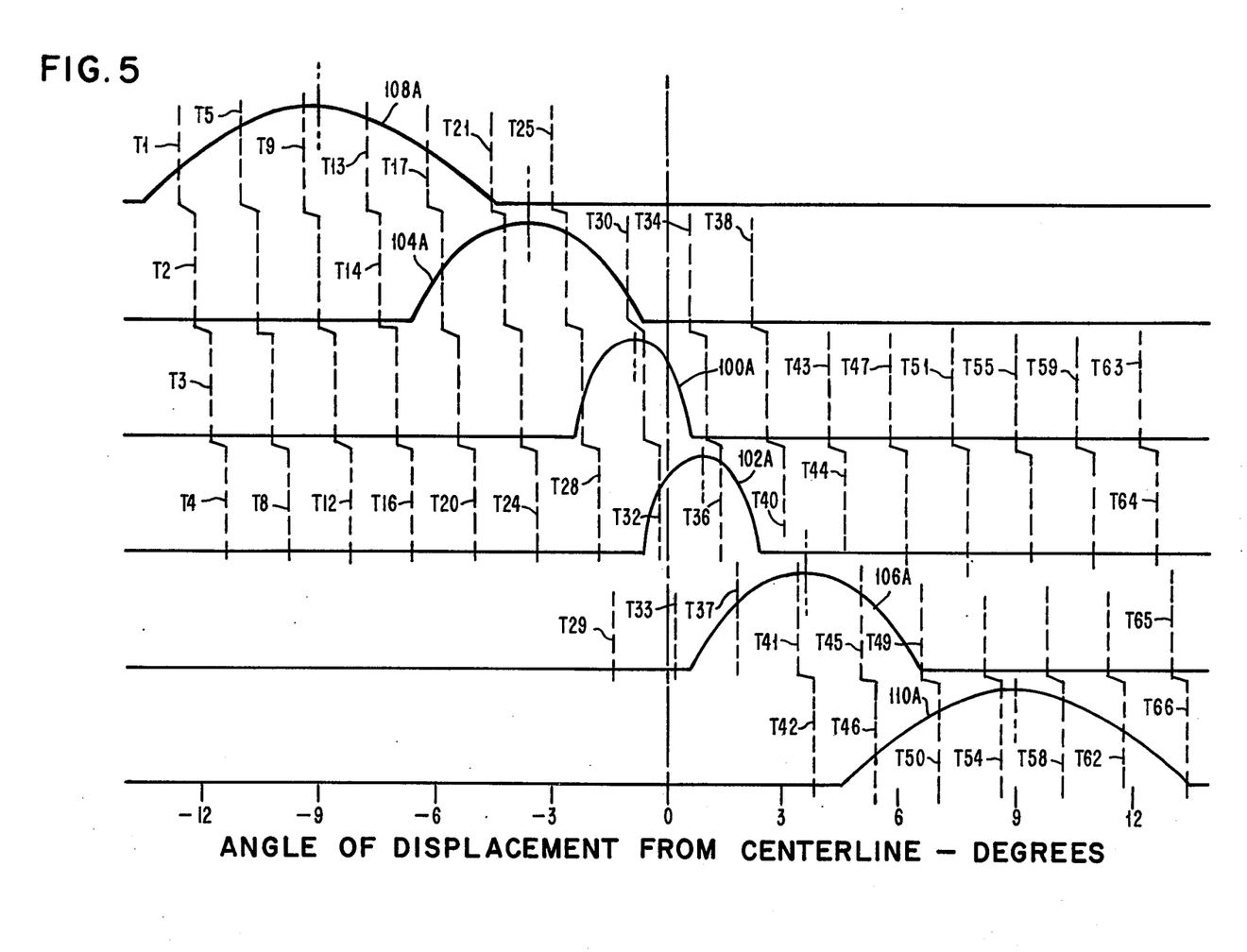
FIG. 5 illustrates the mode of transmission from a dilating beam antenna array wherein different filter functions are transmitted from beam ports having different widths.

Another mode of operation which may be adopted for the transmission of a blended step scan synthesis of a moving scanning beam from fixed antenna beam port elements having various port beam widths is to transmit amplitude versus time filter functions which vary in width to match the width of the individual beam ports. Such a method is illustrated in FIG. 5. In FIG. 5, the same varying beam port widths and spacings are illustrated, but with different filter functions illustrated for the different beams. All other aspects of the embodiment of FIG. 5 are the same as the embodiment of FIG. 4, including the mode of scanning, etc.

One of the major advantages of this variable width filter function is that there is a substantially improved instrumentation accuracy in the aircraft receiver as the pulse is narrowed near the central plane. If the system is being used for aircraft guidance to a course which is band, just above 5,000 KHz. The scanning speed of the synthesized scanning beam is 50 microseconds per degree (or 20,000° per second). Four ports are illuminated for each sub-sequence of illuminations. The switching interval, for each burst of carrier energy from each port is approximately 20 microseconds. The switching frequency of the bursts of radio frequency energy is then 50 KHz, and the frequency of recurrence of sub-sequences of four illuminations each is 12.5 KHz. The low pass filter 90 in the receiver of FIG. 3 is designed with an upper cut off frequency well below 12.5 KHz, such as at 5 KHz.

The synthesized scanning beam preferably has a beam width, as measured at the minus three decibels level of 6°.

By employing the techniques of the present invention, it is possible to synthesize a scanning beam signal which appears to arise from a beam having a width of, for instance, six degrees from beam ports which radiate component beams which are narrower than 6° in width. Such a result is obtained by simply adjusting the program of beam port illuminations in synthesizing the scanning beam. Furthermore, the component beam ports may be designed to produce component beams which are not of uniform width, but a uniform width synthesized scanning beam signal may nevertheless be produced by suitable adjustments in the program of beam port illuminations. Thus, the method of synthesis of scanning beams in accordance with the present invention is very flexible. Because of this flexibility, the method sometimes may be adapted to existing antenna structures not designed initially for practice of the method of this invention.

Most of the disclosure of the specification up to this point is common to the disclosure contained in the above mentioned issued U.S. Pat. No. 4,050,074. The detailed description from this point on refers exclusively to the present invention.

In accordance with this invention, the directionally beamed energy from each of the beam ports is preferably transmitted in a series of bursts having amplitudes representative of samples, which, when taken together, are representative of the impulse response of a low pass filter in the aircraft receiver. Thus, the aircraft receiver does not require such a filter, since the desired signal response is programmed to be produced by the transmitter. Various filter functions may be selected for this purpose. An optimum choice might be a Gaussian filter. However, varius other filter functions may be employed, if desired, such as a filter function corresponding to a triangle on a pedestal shape, or a cosine squared function. A cosine squared function is believed to be quite advantageous for carrying out the present invention, and is a preferred function for this purpose.

The following refers more particularly to the use of non-uniform width beam ports for production of a synthesized scanning beam signal. For instance, one production switched scanning beam microwave antenna having non-uniform width beam port elements is currently produced by the Tull Aviation Corporation of 4 Kaysal Court, Armonk, New York 10504 as the No. 5545 localizer antenna for the interim standard microwave landing system (ISMLS). That antenna array includes elements providing six beam ports spaced symmetrically on opposite sides of a central plane, comprising two three degree wide ports arranged on port center lines 0.9° away from the central plane, two 6° wide ports having center lines spaced 3.6° away from the central plane, and two 9° wide beam ports having center lines spaced 9° away from the central plane. The center-to-center spacings of the individual beams with respect to adjacent beams approximate a fixed fraction of the beam width, and that fraction, in the instance given, is about 0.6. Thus, for instance, the spacing from one of the centermost beams (a 3° wide beam) to the next adjacent 3° beam is 1.8°, which is six-tenths of the 3° beam width. The spacing from the center line of the 3° beam to the center line of the adjacent 6° beam is 2.7°. This is only an approximation of six-tenths of 6°, which would be 3.6°. However, the spacing from the center line of the 6° beam to the center line of the adjacent 9° beam is 5.4°, which is exactly six-tenths of the 9° beam width. The arrangement of the center-to-center spacings of the beams in accordance with an approximate fixed fraction of the beam width is logical and appropriate because the wider beams give broader angular coverage, and therefore need not be so closely spaced.

The reason for the arrangement of narrower beams more closely spaced to the center plane, and wider beams graded outwardly (sometimes referred to as a dilating scanning beam) is to provide improved accuracy of signals at the central plane which, in the ISMLS system is the guidance path plane which is to be adhered to by the aircraft. In the ISMLS system, this plane is defined by modulating the beam port radiations with different modulation frequencies which predominate on opposite sides of the guidance path plane, and which are balanced at the guidance path plane.

It is a very important feature of this invention that dilating beam arrays may be used for synthesizing a substantially continuously moving scanning beam such as previously described above.

In any of the embodiments of this invention, the directionally beamed energy from each of the beam ports is preferably transmitted in a series of bursts having amplitudes representative of samples, which, when taken together, are representative of the impulse response of a low pass filter in the aircraft receiver. Thus, the aircraft receiver does not require such a filter, since the desired signal response is programmed to be produced by the transmitter. Various filter functions may be selected for this purpose. An optimum choice might be a Gaussian filter. However, various other filter functions may be employed, if desired, such as a filter function corresponding to a triangle on a pedestal shape, or a cosine squared function. A cosine squared function is believed to be quite advantageous for carrying out the present invention, and is a preferred function for this purpose.

One method for successfully employing a dilating beam antenna array for the synthesis of a moving beam by the blended scan method of the present invention is to transmit the same filter function from each beam port, that is, the same variation of amplitude versus time represented by the samples from each port. FIG. 4 illustrates this method when employed with the variably spaced variable width beam ports discussed above.

Referring more specifically to FIG 4, the filter function to be transmitted from each beam port is illustrated by an appropriate curve representative of the energy amplitude (vertical coordinate) versus angle of displacement from the central plane of the array (horizontal coordinate). Actually, the horizontal coordinate is also representative of time because the scanning beam to be synthesized has a definite speed of traversal of the angular sector represented by the entire array, and thus the near the central plane, this is an important advantage, since higher accuracy is available when the aircraft is on course. It is a unique feature of the present invention that the filter function can be varied to match the beam width with very little difficulty in the transmitter since this simply means that different pre-programmed illumination amplitude values are provided for each sample illumination. If such a variable beam width filter function was required to be provided in the aircraft itself, this would present a very complicated problem.

The only possible disadvantage in the variable beam width arrangement might be that the receiver, which detects the leading edge and the trailing edge of the pulse of energy produced by the synthesized scanning beam, might be "fooled" by a slight variation in the filter function (time versus energy profile) occurring in the interval between the leading edge and the trailing edge of the received pulse of energy from the synthesized beam.

However, any error arising from this effect is relatively minor, and is substantially minimized at angular positions near the center line of the array. Furthermore, since this error is predictable, it is easily compensated for by a calibration adjustment.

With the narrow beam port functions of FIG. 5, and with the sub-sequence rate as previously specified, and as illustrated in FIG. 5, it is seen that only two illuminations are typically available from the central beams having the narrowest characteristics illustrated at 100A and 102A. While this is believed to be a workable arrangement, it is desirable to provide for at least three illuminations. Accordingly, it may be preferable to increase the sub-sequence frequency of recurrence in order to provide at least one additional illumination on these narrow beam characteristics.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. Apparatus for synthesizing a continuous scanning beam of radio energy comprising
    an array of fixed antenna elements providing radiation beam ports aimed radially outwardly to different angles in an arc over which the scanning beam is to be scanned,
    a source of microwave radio frequency energy,
    switching means connected between said energy source and said antenna elements and operable for rapidly switching the radio frequency energy in a repeating sequence of bursts of energy to illuminate the different ones of the radiation beam ports at a switching frequency which is substantially greater than the rate of successive interception of the scanning beam to be synthesized with the individual radiation beam port positions,
    means connected for modulating the energy levels of the individual bursts of radio frequency energy in a predetermined program to provide a composite beam energy profile which is a synthesized directional beam which is moving at a predetermined desired scanning rate,
    said modulating means being operable to provide energy levels of the successive individual bursts of radio frequency energy from each radiation beam port producing a composite energy profile from that port which is representative of the impulse function of a low pass filter.

2. Apparatus as claimed in claim 1 wherein said modulating means produces a composite beam port energy profile for each port corresponding to an idealized cosine squared impulse response low pass filter function.

3. Apparatus as claimed in claim 1 wherein
    the individual fixed antenna elements of said array are designed to provide radiation beam ports of substantially different widths
    and arranged at non-uniform angular spacings in which the center-to-center angular spacings of adjacent ports vary as a function of the beam port width.

4. Apparatus as claimed in claim 3 wherein
    the ones of said fixed antenna elements providing the widest beam ports and having the widest center-to-center spacings are arranged to radiate beams near the ends of the arc over which the scanning beam is to be scanned and the antenna elements providing the narrowest beam ports having the smallest angular center-to-center spacings are arranged to radiate beams nearest the center of the arc over which the scanning beam is to be scanned
    with antenna elements providing beam ports of intermediate width and intermediate spacing being arranged to radiate beams between the central portion of the arc and the ends of the arc.

5. Apparatus as claimed in claim 3 wherein the duration of each individual burst of radio frequency energy from each port is predetermined at a value so as to equalize the peak energy emitted from each port with the peak energy emitted from every other port.

6. Apparatus as claimed in claim 3 wherein the filter function for each port provides an impulse response having a duration generally corresponding to the interval for traversal of the synthesized beam across the angular width of the beam from that particular port.

7. Apparatus as claimed in claim 3 wherein the same filter function impulse response function determines the modulation by said modulating means of the energy level of the individual bursts of radio frequency energy from each of said radiation beam ports regardless of the angular width of the port.

8. Apparatus as claimed in claim 7 wherein the filter function for each of said ports provides an impulse response having a duration generally corresponding to the interval for traversal of the synthesized scanning beam across the angular width of the widest of said ports.

* * * * *